Aug. 12, 1952     W. R. STAMLER     2,606,504
CAR SHIFTING MECHANISM
Filed Oct. 8, 1948     5 Sheets-Sheet 1
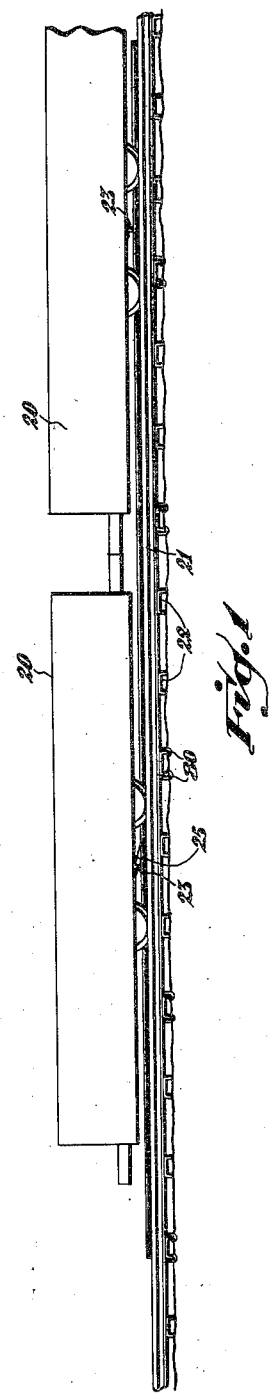
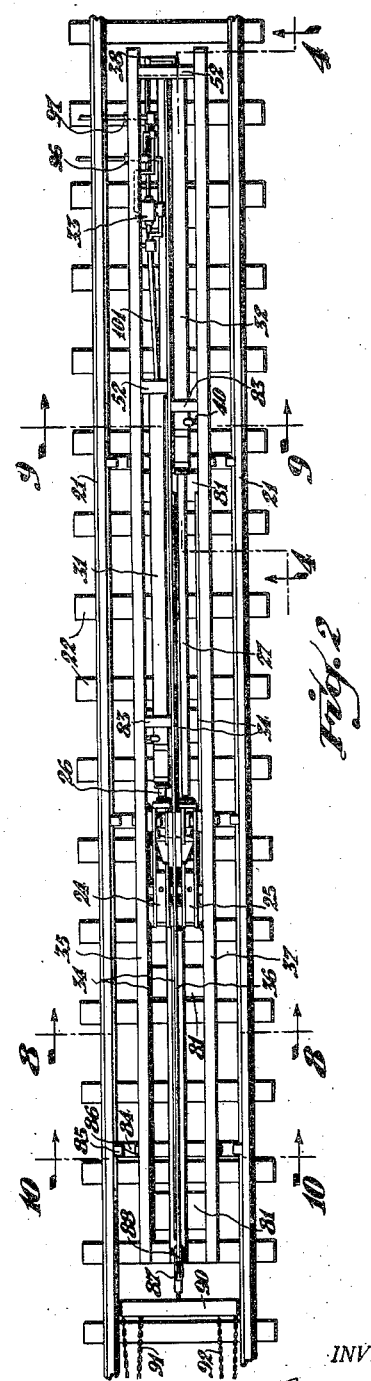
INVENTOR.
William Raymond Stamler
BY
Wood, Arey, Herron & Evans
Attorneys INVENTOR.
William Raymond Stamler
BY
Wood, Arey, Herron & Evans
Attorneys Aug. 12, 1952 W. R. STAMLER 2,606,504
CAR SHIFTING MECHANISM
Filed Oct. 8, 1948 5 Sheets—Sheet 3

INVENTOR.
William Raymond Stamler
BY
Wood, Arey, Herron & Evans
Attorneys

INVENTOR.
William Raymond Stamler
BY
Wood, Arey, Herron & Evans
Attorneys

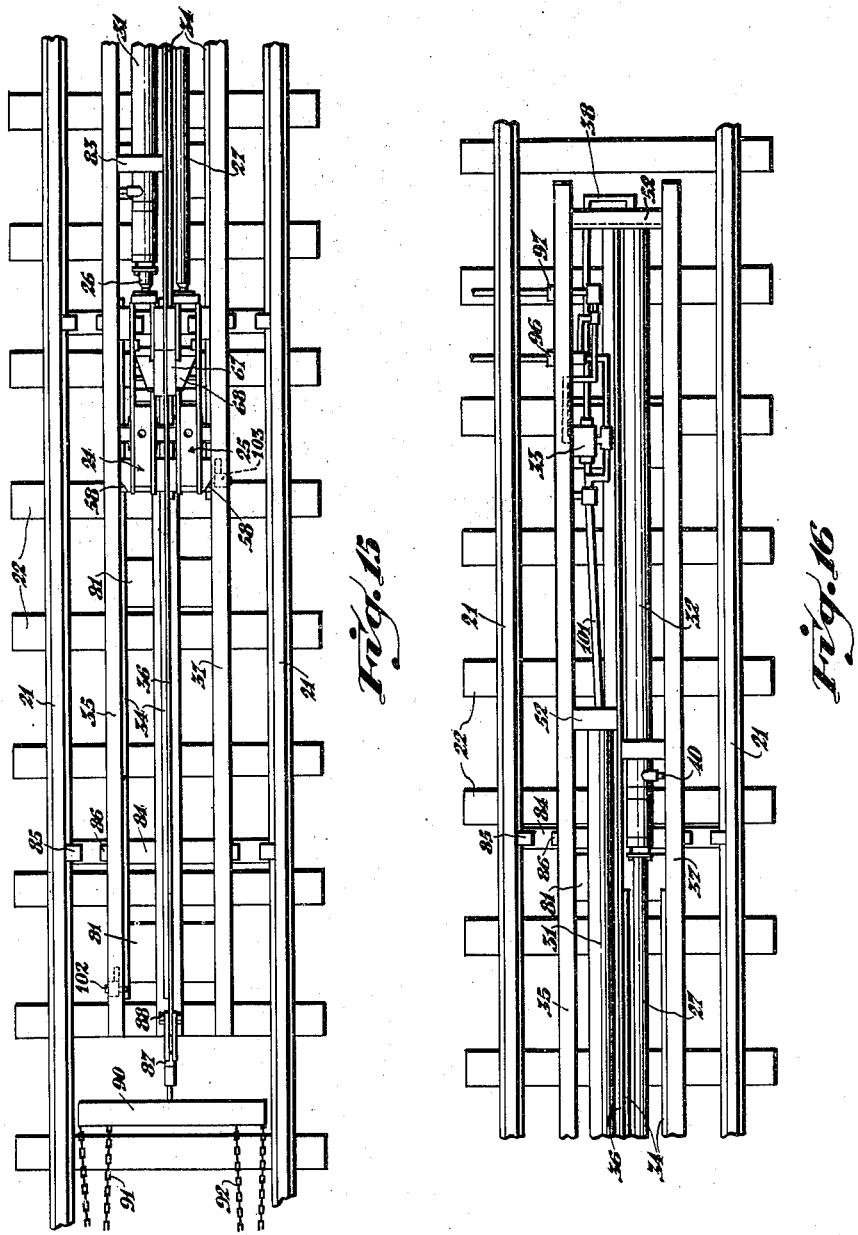

Patented Aug. 12, 1952

2,606,504

UNITED STATES PATENT OFFICE 2,606,504

CAR SHIFTING MECHANISM

William Raymond Stamler, Paris, Ky.

Application October 8, 1948, Serial No. 53,436

13 Claims. (Cl. 104—162)

This invention relates to apparatus for feeding and advancing cars of the type used in mines, quarries, and other industrial installations. The invention is directed particularly to a car feeder apparatus, hydraulically actuated for advancing cars serially upon a track, and is intended to provide a substantially unitary piece of equipment which readily may be installed for cooperation with existing track facilities.

In the past, it has been conventional in American mining practice, to move one or a string of cars by means of a drum hoist adapted to actuate a cable or rope which is fastened to the foremost car of the series. After the car or string has been advanced, the rope is uncoupled by hand and subsequently refastened to the next car or string of cars for subsequent operation. More recently, systems have been proposed embodying several pushers or so-called "barneys" which are interconnected to operate in unison by means of a continuous or endless cable system in which the barneys respectively are connected. In this type of apparatus, each barney is operative through a distance approximating one-half of a car length; thus, one pusher unit advances the car partially through its length and then retracts while the other pusher unit of the system advances the car through the remainder of its length. Such barneys usually are equipped with spring actuated dogs for engaging some fixed portion of the car. While cable actuated barneys provide the highly desirable continuous car movement and avoid the delays occasioned by the more simple hoist and rope mechanisms due to coupling and uncoupling, they are relatively expensive, excessively heavy and can only be dismantled, transported and installed by a number of men who must work for a considerable length of time. Moreover, their use presents a definite hazard to equipment and personnel, since the ropes or cable may break, if overloaded, and imperil life in doing so.

American mining experts have been informed that attempts have been made in several European countries to overcome the inadequacies of the previously described systems. For example; it is understood that the Germans have employed car shifting mechanisms comprising air actuated cylinders staggered longitudinally and arranged between the mine car tracks. A tappet or car engaging member is fixed to the unsupported end of the piston rod of each cylinder and is reciprocated back and forth in response to compressed air applied alternately at the opposite ends of the cylinder. The cylinders are so staggered that the tappet of the rearmost cylinder engages a car on its forward stroke and advance the car until the tappet of the forward cylinder effects engagement with the car and continues to drive the car forward, while the rearward tappet returns to its starting position. Unfortunately, this type of system has proven to be too impractical for adaption to American mining practices for several reasons. In the first place, no means have been devised for supporting or guiding the ends of the piston rod bearing the tappet or car engaging member and, consequently, the piston stroke must be extremely short so that contact between the tappet and the car is insured at all times. When a longer stroke is desired, it is necessary to either enlarge the cylinder and diameter of the piston rod considerably, or to interlink the piston rod of one cylinder with the piston rod of the other cylinder by means of a sheave supported cable in such a manner that the air force applied to one piston to retract its tappet is transmitted through the cable and supplements the air force driving the active tappet forward. Unfortunately, neither of these mechanisms have been suitable to shift the extremely long, low, standard American mining car. It is virtually impossible to install a cylinder of large diameter in the clearance between the low bottoms of the American car and the track bed and the German cable-linked cylinder systems are subject to many of the disadvantages of the cable hoist system. For example; if the cable breaks, which it often does, the system becomes totally inoperative.

The principal purpose of this invention has been to provide car feeding apparatus which is of a simplified nature and more rugged, compact and reliable and which will eliminate, or greatly reduce the disadvantages of the cable and cylinder systems of the past. In order fully to appreciate the improvements of the present invention, it is helpful briefly to describe the conditions under which car feeder systems are operated in a mine or quarry.

Ordinarily, the tracks or rails upon which the transport cars are operated are laid over the open floor of the mine or quarry and, since the trackage installation is usually of a temporary nature, no special precautions are taken to level the track or to prepare the track bed. Such being the case, the tracks are of an uneven undulating nature, both sidewise and longitudinally. This condition imposes problems of a difficult nature in respect to the actuation of the barneys in their path of movement. Since barney systems can only pull the cars, they are usualy installed on gradually inclined portions of the track so that the cars are advanced up-grade, thereby insuring that the cars will stop when the forward movement of the barney terminates. In rope or cable type barney systems and in cylinder systems where the pistons are interlinked by means of a cable, the cables are often stretched, with the result that the advancing barney does not engage the car until after the retreating barney has lost contact with it. During this interval, the cars will tend to roll backward, with increasing momentum, until they abruptly strike the advancing barney, imposing severe shocks on the system and often breaking the barney. In many instances, the car will run free down the incline endangering property and personnel.

It is, therefore, an additional purpose of this invention to provide a hydraulically actuated barney system, in which the barneys have a fixed, invariable stroke, and positive timing means are employed to insure substantial simultaneous coaction between the advancing barney in engaging the car and the retreating barney in releasing the car.

In a conventional operation, a locomotive backs into one or a string of the cars advanced to a predetermined point by the feeder system, but it is virtually impossible for the locomotive to couple with the car or cars without substantial over-travel. In a cable type of system, this backward movement exerts a strong impact on the dog of the active barney and it is frequently broken. The impact also imposes a severe load upon the actuating cable in the type of system commonly in use, and as a result, the cables either become stretched or snapped. For these reasons, the present invention contemplates a hydraulically actuated barney system. The invention in this respect embodies an overload relief valve which spills oil from the system in event of backward impact on an active barney during locomotive coupling, and thereby safeguards the apparatus and the operators from injury.

It is a further objective of the invention to provide a hydraulic system utilizing multiple barneys which are activated serially, or sequentially, to advance a car through a pre-determined distance. This invention is predicated upon the concept of providing staggered power motors which successively actuate independent guide supported barneys through coextensive paths of travel. The system is designed and arranged to utilize cylinders of piston stroke long enough to handle the excessively long and heavy, standard American mine car, and which is sufficiently compact to be installed beneath the low bottoms of the mine car, and yet powerful enough to handle a heavy car without resort to cable linkage between the two pistons. The advantages of this new and improved design arise in part from the concept of providing staggered power motors which are connected to independently flexible guide barneys at the ends of the piston rods, as distinguished from car engaging tappets fixed rigidly to the end of the piston rod. The combination of the staggered power motors and the guided barneys permits the system to handle long, heavy cars and, since the piston rods and barneys are fully supported by the guides, enables the use of operating parts of minimum dimensions, it being unnecessary to excessively rigidify the piston and cylinder by over-dimensioning.

It is a further objective of the present invention to provide an articulated connection between the piston of a barney actuating cylinder and the piston rod, and between the piston rod and the barney to accommodate the misalignments which commonly may be expected in the installation and use of equipment of this type. In this manner, substantial misalignment may exist between the axis of the cylinder and the path of movement of the barney without imposing severe lateral strains or binding forces on the piston of the actuating cylinder.

It is a further objective of the present invention to provide a barney which is guided upon rails by means of pivoted shoes which sustain the barney in its path regardless of the undulations, crookedness or unevenness of the rails or track. The invention also contemplates a barney having a car-engaging pawl, seated in bearing means integral with the barney frame so that the thrust stresses transmitted from the cars are absorbed by the frame instead of by the pawl pin which in present barneys normally absorbs the stresses.

The hydraulic system contemplated by the present invention embodies a source of hydraulic pressure fluid, conduits for conducting the fluid to the respective hydraulic cylinders and pilot valves which are tripped in consequence to barney movement for admitting and exhausting fluid from the hydraulic system. By virtue of this system, car advancement may proceed in a substantially uniform continuous manner from one end of the feeder apparatus to the other, the engagement of one barney with a car in a feeding direction being substantially coincidental with the termination of engagement of the preceding barney.

Those skilled in the art readily will comprehend, from the foregoing discussion of the principles upon which the present invention is predicated and the following detailed description, other modifications to which the invention is susceptible.

In the drawings:

Figure 1 is a side view of several mine cars on a portion of a trackage system in which the car shifting mechanism of this invention is installed.

Figure 2 is a horizontal plan view showing the improved car shifting mechanism.

Figure 15 is a horizontal plan view of the front portion of the car shifting mechanism shown in Figure 2 and constituting an enlargement of the forward portion of Figure 2.

Figure 16 is a horizontal plan view similar to Figure 2 but showing an enlargement of the rear portion of the car shifting mechanism.

Figure 3:
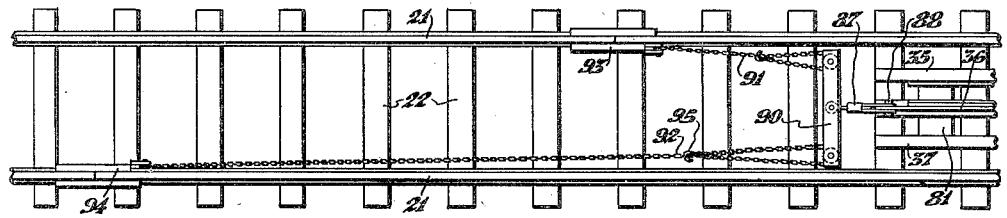
Figure 3 is a top plan view of a typical track anchor which may be used to stabilize the car shifting mechanism.

A portion of a representative mine trackage system in which the present invention is installed is shown in Figures 1 and 2 where a string of coupled mine cars 20 is shown on conventional tracks 21 which are mounted on channel type cross-ties 22. Secured beneath the center portion of the botom of each car is a car-haul bracket 23 which is adapted to be successively engaged by the reciprocating barneys 24 and 25 which move between the tracks in parallel, coextensive paths of travel so arranged that the path of travel of barney 25 terminates at the beginning of the path of travel of barney 24. It is understood that the barneys may engage any other suitable fixed position of the car if a car haul bracket is not provided. These barneys are respectively actuated by piston rods 26 and 27 connected to pistons 29 and 30 which move in cylinders 31 and 32. Each cylinder communicates with a hydraulic system indicated generally at 33 which supplies the motive power for reciprocating the pistons within the cylinders.

Each of the barneys, 24 and 25, is directed through its travel by sets of guides 34 respectively mounted on rails 35 and 36 and rails 36 and 37, which are positioned between the car tracks and anchored to the track system.

As best seen in Figure 2, the cylinders are arranged between the barney guide rails in parallel but longitudinally staggered relationship. In the preferred embodiment, the rearmost cylinder 32 is mounted between the guide rails 36 and 37 one-half car length to the rear of cylinder 31 which is secured between guides 35 and 36. Since the length of the piston stroke and, consequently, the distance of travel of the barney is dimensioned to equal slightly more than one-half of the overall length of the mine car, from coupler to coupler, only two cylinder-barney combinations are needed to advance the string of cars for one complete car length. It has been ascertained that a cylinder-piston combination can be made to compact dimensions and yet be sufficiently strong and powerful to move a string of standard, modern mine cars over one-half car length. Hence, the double cylinder-barney combinations employing the half-car length stroke permit the use of cylinders and piston rods of sufficiently small diameter to be accommodated in the extremely small clearance between the track bed and the low bottoms of the mine cars without necessitating the digging of a pit foundation to receive the cylinders which is not practical because of the temporary nature of the installation. For facility of description, a two barney feeder is shown herein, although it is apparent that any number of units may be used as dictated by conditions. In the event that longer mine cars are employed, this invention contemplates the use of three, or even four cylinders, staggered longitudinally for actuation of barneys through strokes of one-third car length or one-fourth car length, respectively.

When the system is in operation, barney 25, engaged with a car-haul bracket on the bottom of a car, begins its advance just forward of cylinder 32 and moves the cars along the tracks until it reaches a point parallel to, but slightly in advance of cylinder 31. At this point (illustrated in Figure 2) the car is engaged by barney 24 which continues to advance the car for another half-car length. Hydraulic pressure is alternately applied to the opposite ends of the cylinders so that one barney is being retracted during the forward stroke of the other barney. Thus, while barney 24 advances, barney 25 is being withdrawn to its starting position where it engages the following car and, upon subsequent forward motion, continues the advance of the string of cars. Barney 24 is retracted during the forward motion of barney 25 and is in a position to further the advance of the cars when barney 24 reaches the end of its stroke. It will be observed that the length of barney travel is fixed and definite at all times and that the respective barneys engage the cars at precisely the same point during the stroke, thus providing a smooth continuous movement.

Figure 4:
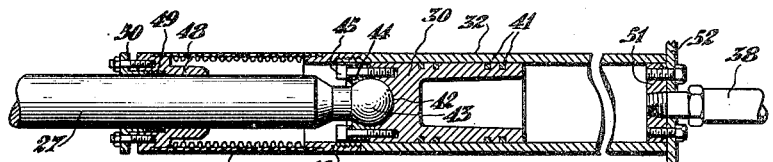
Figure 4 is a sectional view taken along line 4—4 of Figure 2.

The detailed construction of the cylinders and the pistons associated therewith are best seen in Figure 4 which illustrates the construction of cylinder 32. Since both cylinders may be of identical construction, reference will only be made to this cylinder. Piston 30 reciprocates through the length of the cylinder in response to hydraulic pressure alternately applied at its opposite ends, through a line 38, which communicates with the bore at the head end of the cylinder and through a line 40 communicating with the bore at the front end of the cylinder. In a preferred embodiment, line 38 is supplied by the main hydraulic system while line 40 is supplied from an auxiliary system which, as subsequently described, is not connected to a constant source of fluid pressure. While the forward line 40 is not shown in Figure 4 because the section is taken along a plane which does not disclose the connection between line 40 and the cylinder, the entry point of line 40 can be seen in Figure 2.

The piston has circumferential oil seal rings 41 which prevent excessive leakage of the oil during the stroke but permit a small amount of oil to leak from the chamber in the rear end of the cylinder to the chamber at the forward end of the cylinder to make up the oil lost from the auxiliary system through gland leakage. The forward portion of the piston is formed into a spherical seat 42 which receives a ball 43, formed on the end of the piston rod 27. The ball is retained in its seat by collar 44 secured to the piston by bolts 45. It is apparent that the ball 42 may revolve freely in the spherical seat, thus providing a flexible, articulated connection between the piston and the piston rod. While the ball-socket connection is preferred, it is obvious that other means of articulation may be employed. Thus, the thrust transmitted from the barney as it engages the car, through the piston rod is directed substantially axially through the piston. However, the piston rod is free to adapt itself to conform to the irregular movement of the barney as it travels over its uneven guides, while maintaining the required relationship to the car haul attachment.

A sleve 46 is screwed to the end of the cylinder and carries a cylinder extension 47 of flexible tubin. The end of the tubing is secured to a floating end cap 48 slidably mounted on the piston rod. Leakage between the end cap and piston is prevented by a packing gland 49 compressed in place by a retaining memer 50 bolted to the end cap. The flexible cylinder extension thus formed may deviate from axial alignment with the cylinder thereby providing oil seal means which follows the piston rod as it adapts itself to the irregular movement of the barney. The other end of each cylinder is closed by a cap 51 which is bolted to brace plates 52 transversely secured between the guide rails 35 and 36, and 36 and 37, respectively.

The opposite end of the piston rod is joined in a flexible connection to the rear end of the barney by means of a ball-socket joint 53 very similar in construction to the joint between the piston and the piston rod. A cap 53a bolted to the end of the barney maintains the connection but permits rotation of the ball within its socket, thus allowing the piston rod to adjust itself to compensate for the irregularities of alignment as the barney moves over its guides. The articulated connections at the ends of the piston rods insure substantially concentric loading of the rod and permit the use of a rod of much smaller diameter than if eccentrically loaded stresses had to be considered.

Figure 8:
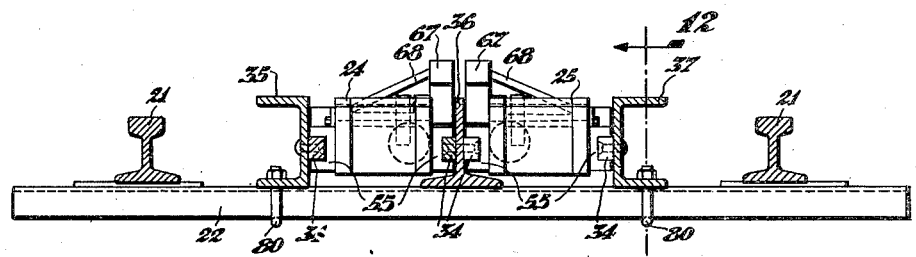
Figure 8 is a sectional view taken along line 8—8 of Figure 2.
Figure 9:
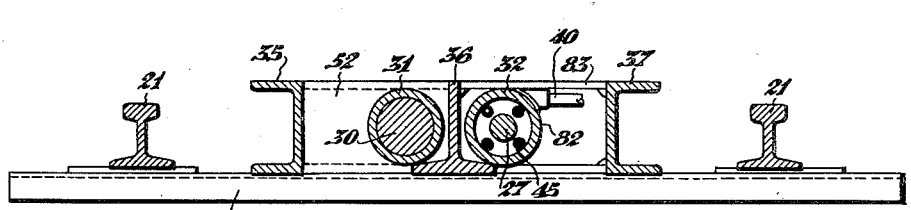
Figure 9 is a sectional view taken along line 9—9 of Figure 2.
Figure 10:
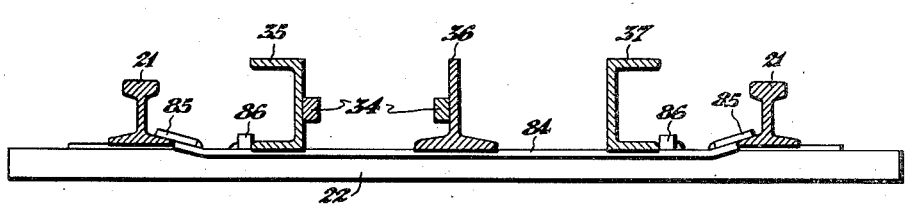
Figure 10 is a sectional view taken along line 10—10 of Figure 2.
Figures 11, 12:
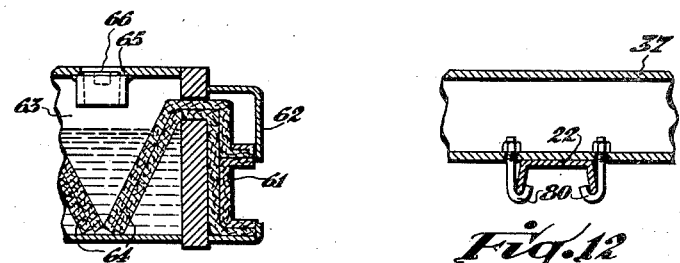
Figure 11 is a sectional view taken through the barney along line 11—11 of Figure 6.
Figure 12 is a sectional view taken along line 12—12 of Figure 8.

The barney itself is comprised of a body 54 having cooperating pairs of channel-type shoes 55 and 55a pivoted on opposite sides at the front and rear of the body. These shoes ride on bar runners or guides 34 secured on the inner side of the guide beams 35 and 36, and 36 and 37 as shown in Figure 8. Each of the shoes is pivotally journalled in the body by means of a stud 56 extending through a bore in the side wall of the body and into bosses 57 formed on the inner portion of the sidewall. The shoes pivot freely with the studs and independently of each other; consequently following the undulating guides without binding. The barneys may be equipped with wheels which run on suitable tracks instead of shoes, if desired.

A cam surface 58 is formed on one of the front shoes. When the barney reaches the end of its stroke, the cam engages and trips a pilot valve which causes the hydraulic pressure in the cylinders to be reversed and the barney to be withdrawn. To insure the proper positioning of the cam surface, a coil spring 60, arranged between the pivot studs on the front pair of shoes, forces the shoes outwardly against the runners and holds the cam surface from becoming misaligned so far that it is inoperative to perform its function of tripping the pilot valve. It is apparent that other means for directing the fluid from one cylinder to the other may be employed as desired.

To facilitate passage of the shoes over the guides, the barney is provided with a guide lubricating mechanism comprising felt channel members 61, arranged on opposite sides of the body, which wipe the guide runners with oil as the barney moves back and forth over the runners. Suitable bracket assemblies 62 are bolted to the opposite side walls of the barney and support the felt channels holding them against the guide bars. Oil or other lubricant carried in a reservoir 63 is fed to the felt channels through absorbent feeder strips or wicks 64 which lie within the reservoir, pass through apertures in the side wall and contact the rear portions of the felt channels. The reservoir may be refilled when necessary through a port 65 in the top of the barney which is normally closed by a removable plug 66.

The moving barney engages the car-haul bracket on the underside of the mine car through a retractable pawl or dog 67 which is pivotally mounted on the barney body. The pawl, on each barney, extends along the side of the barney nearest the center line of the track so that it will engage the car-haul bracket substantially in the center. Thus barney 24 has its pawl arranged on the left side looking in the direction of forward travel, and barney 25 has its pawl arranged on the right side looking in the same direction. This arrangement of the pawls results in the application of the moving force exerted by both barneys in the central portion of the car-haul bracket and prevents the car from yawing from side to side during the transition from one barney to the other. The pawl is reenforced laterally by a wing 68 extending from the pawl and terminating in a tubular sleeve 70. The sleeve and pawl rotate about and are retained in position by a pivot pin 71 journalled in the side walls of the body and passing through the sleeve and into a hole in the pawl.

The pawl and sleeve revolve on spaced bosses 72 and 73 having arcuate seats which embrace and support the rounded surfaces of the sleeve and the pawl end 74 respectively. Thus, the rearward thrust imposed on the pawl, as it contacts the car bracket, is distributed both over the wing to the sleeve and longitudinally through the pawl, being resisted and absorbed by the rounded seats in the spaced supporting bosses.

It will be observed that the pawl and sleeve may rotate freely in their respective seats, the seats absorbing the thrust and serving to relieve the pin 71 of shearing stresses which would normally cause the eventual failure of the pin by virtue of the fact that a relatively large, radial clearance is provided between the pin and the adjacent surfaces. In fact, the pin 71 functions primarily as a retaining member and takes little, if any, of the thrust forces. A coil spring 75, extending between the pawl wing and a seat 76 formed in the bottom of the barney constantly urges the pawl in upward rotation about its axis and insures engagement of the pawl with the bracket. Moreover, the axis of the coil spring is canted slightly to the rear, so that the spring constantly forces the pawl and sleeve into engagement in their seats, thus, maintaining accurate alignment of the pawl regardless of the excessive clearance provided around the retaining pin. Upward movement of the pawl is limited by a leg 77 depending from the underside of the wing which abuts a stop 78 formed in the barney when the spring has urged the pawl into car engaging position. Hence, while the barney moves in its forward travel, the pawl is held in the up, or car engaging position, under action of the coil spring, but as the barney moves to the rear and the pawl is struck by an obstacle, such as the car-haul bracket on the following car, the pawl is free to deflect downwardly, permitting the barney to pass the obstacle easily.

In order to provide a car shifting mechanism which may be easily transported, the individual barney-cylinder combinations, along with the major portion of the hydraulic system are mounted on the barney guide beams and secured together into an integral rugged compact structure which may be tied to a locomotive and dragged from place to place in the trackage system. Moreover, since the overall length of the feeder for the usual car approximately equals the length of a standard track rail, the feeder may be transported by any of the methods utilized in moving track rails. Thus, the beams 35, 36 and 37 constitute a skidable frame for the major portion of the mechanism. The channel beams 35 and 37 form the frame sides and are detachably secured to the channel-type cross ties 22 by means of J-bolts 80 extending through bolt holes in the channel feet. An inverted T-beam 36 is located centrally between the channel beams and tied to them by means of longitudinally spaced rib plates 81 which are welded underneath the feet of the channel beams and the T-beam.

The cylinders are supported between the beams by channel type transverse brace plates 52 which are bolted to the rear ends of the cylinders and extend between the center T-beam 36 and the side channel beams 35 and 37. The forward end of each cylinder passes through an aperture 82 in a channel shaped support plate 83 also secured between the T-beam and the appropriate side channel.

The frame unit is positioned centrally between the car tracks by separate lateral spacers 84 which are not secured to the beams 35, 36 and 37, but lie between the car tracks and pass beneath the beam feet. The spacers are supported at each end by extension plates 85 borne on the car track flanges and dimensioned to clear the car tracks if the spacer is canted slightly when it is desired to remove the spacers or place them in position. Locating blocks 86, fixed to the upper surface of the spacer, are positioned to bear against the flanges of the channel beams 35 and 37 and serve to center the shifter assembly between the car tracks.

Although the side channel beams are firmly bolted to the cross ties, the rearward thrust forces are substantial and it may be desirable to further stabilize the shifter assembly against rearward displacement by means of a track anchor (best seen in Figure 3). In the preferred embodiment, the end of the T-beam 36 is shackled by a hasp 87 engaged with a bolt 88 extending transversely through the beam. This hasp is secured to the center of a chain-spreader bar 90 which is held in position by two chains 91 and 92 fixed to special splice bars 93 and 94 bolted to the inside of the car tracks. The special splice bars are merely modifications of the conventional splice bars in which a bolt for fastening the chain ends is incorporated. It is conventional practice to join the abutting ends of the separate rail sections by dual bars which are bolted to the opposite sides of the endwise portions of the tracks at the point of juncture.

To strengthen the car tracks, the rail sections are laid so that the joints in one rail are staggered in relation to the joints of the other rail. Since the chains are anchored on the internal splice bars on the opposite sides of the track and the splice bars are not parallel to each other, one chain 91 is substantially shorter than the other chain. Each chain passes around a sheave at the opposite ends of the spreader bar and terminates in a hook 95 engaged in the chain links. Naturally, the hooks may be engaged with any one of a number of links thus providing means for adjusting the length of the chains. Since the major force transmitted to the mechanism is always rearward due to the tendency of the cylinder to move to the rear on the power stroke of the piston, the track anchor described above is entirely adequate for stabilizing the mechanism against rearward movement. The J-bolts connected to the cross ties provide sufficient stability against movement in a forward direction.

When it is desired to move the mechanism to a new location, the special splice bars are removed from the inside of the car tracks and the conventional bars replaced. The J-bolts are removed from connection with the cross ties, and the hydraulic system is uncoupled from its components residing outside the frame work by loosening couplings 96 and 97. A locomotive is then hitched to the center beam 36 and the entire frame dragged forward to the new location, leaving the lateral spacers behind. The spacers are manually removed from the old location and dropped in the new location. The locomotive then pulls the shifter in position between the locating blocks on the lateral spacers, thereby accurately centering the mechanism. The hydraulic system is re-coupled to the external components, the J-bolts fastened to the cross ties and the track anchor installed, thus placing the unit in readiness for operation in the new location. The installation operation is relatively simple and can be accomplished by one or two skilled men, since the heavy structures are moved by locomotive power. This simplified procedure permits a great saving in time and labor, in comparison to the procedure necessary to move barney type feeders of the type now in use.

Figure 13:
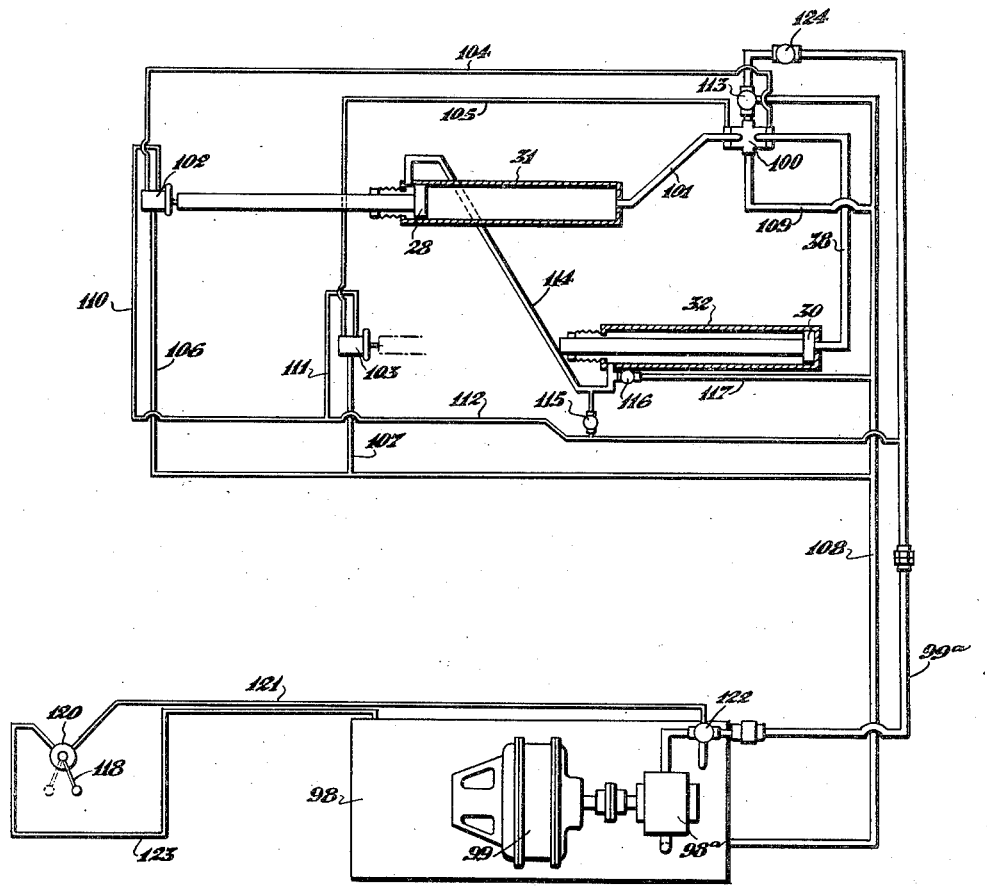
Figure 13 is a diagrammatic sketch of a typical hydraulic system which may be used in conjunction with this invention.

A representative hydraulic system for actuating the cylinders is shown in Figure 13. In reality, two separate hydraulic systems are used. One, the main system, actuates the pistons on the power stroke, the other, an auxiliary system, returns the pistons on the retraction stroke. The power stroke actuating system comprises an oil reservoir 98 connected to a delivery pump 98a which is driven by a motor 99. This pump supplies oil to the main supply line 99a which terminates in a four-way selector valve 100 which alternately directs fluid through leads 38 and 101 in communication with the head ends of the cylinders. The selector valve 100 is alternately set to supply fluid to one or the other of the cylinders by means of trip or pilot valves 102 and 103 which are respectively arranged at the ends of the strokes of the barneys 24 and 25 and which are alternately engaged and tripped by the cam surfaces 58 on the front barney shoes when the barneys reach the ends of their strokes. Lead lines 104 and 105 extend from these trip valves to the selector valve 100 and exhaust lines 106 and 107 provide communication between the respective trip valves and the main exhaust line 108 which returns to the reservoir. An exhaust line 109 is provided to permit the oil from the cylinders to flow to the tank while their pistons are being retracted. Lines 110, 111, 112 supply fluid under pressure to the pilot valves for operation of the selector valve 100. Check valve 124 is provided in the main supply line 99a and prevents backward movement of the barney due to the tendency of the cars to run down-slope when the feeder is stopped.

Preferably, valves 102 and 103 are identical, operate in the same way and are supplied by a common fluid pressure line 112 which connects them with the main supply line 99a through lines 110 and 111 respectively. In addition, both of these valves are connected by exhaust lines 106 and 107 respectively with the main exhaust line 108. Also, both valves have lead lines 104 and 105, respectively, which are designed to transmit fluid pressure to opposite ends of selector valve 100. When valve 102, for example, is tripped by contact with barney 24, as shown in Figure 13, fluid pressure from line 110 is directed into line 104, which pressure causes the selector valve 100 to shift so that fluid pressure from the main supply line 99a is directed through line 38 to the head end of cylinder 32. At the same time, selector valve 100 opens line 101 from cylinder 31 into exhaust line 109. This results in the bleeding of cylinder 31 and a build up of pressure at the head end of cylinder 32 in back of piston 30. Valve 103 operates in the same way that valve 102 operates, but when it is tripped, it directs fluid pressure through line 105 from lines 111 and 112 off the main pressure supply line 99a to selector valve 100 at the side opposite that which is connected with line 104 from valve 102. Pressure from line 105 causes the selector valve 100 to shift, and, in doing so, opens the main supply of fluid pressure from line 99a into line 101 and thus to piston 31, while at the same time opening line 38 from cylinder 32 to the exhaust line 109. Thus, whether the control of the selector valve 100 is coming from valve 102 or 103, in either instance, one of lines 101 or 38 is connected with main supply line 99a, and, at the same time, the other of these two lines is exhausted through line 109 back to the tank. The result is the alternate reciprocating operation of pistons 28 and 30, and thus the alternate operation of barneys 24 and 25, respectively.

The exhaust lines 106 and 107 leading from valves 102 and 103, respectively, are provided so that when there is a build up of back pressure, for example, in line 104, due to the movement of selector valve 100 by pressure through line 105, hydraulic fluid can move through it to exhaust line 108. Thus, line 104, for example, alternately is connected with pressure line 110 and exhaust line 106 during the operation of valve 102, exhaust line 106 being connected with line 104 whenever valve 102 is not functioning.

A particularly noteworthy feature of this invention resides in the provision of a pressure relief valve 113 in the supply line 99a between the selector valve 100 and check valve 124. This relief valve has a slightly higher setting than the system relief valve 122. When the system is subjected to abrupt shocks as, for example, when a locomotive backs into a string of cars and over-travels, forcing the cars sharply against the barney, the force transmitted rearwardly from the barney results in excessive fluid pressure in the cylinders and the connecting lines 101 and 38 between the cylinders 31 and 32 respectively and the pressure relief valve 113. This pressure causes the valve 113 to open, spilling fluid into the exhaust line 108 and relieving the pressure in the cylinders, thereby permitting the contacted barney to move rearwardly, saving the system and barney from damage which could result in a run-away string of cars. The construction of the various valves is well known to those skilled in the art and therefore is not described in detail.

The auxiliary circuit consists simply of a line 114 which connects the forward ends of the cylinder and permits fluid to travel from one cylinder to the other in response to piston movement. Oil pressure lost through leakage is normally made up by the oil which slips past the oil seal rings of the piston from the head end of the cylinder to the forward end. If the pressure drops too low, valve 115, which connects line 114 with pressure line 112, may be manually opened to permit oil to flow into the circuit. A relief valve 116 is provided in the line to spill fluid into the exhaust line 117 when the pressure becomes excessive, line 117 being connected with exhaust line 108. This valve permits the retracting system to be designed for relatively low pressures, thereby achieving a substantial saving in both initial and maintenance costs.

To facilitate description, the pistons are shown in Figure 13 in the starting position, i. e., when barney 25 is fully retracted and engaged with a car and barney 24 is at the end of its travel. The motor 99 and pump 98a operate continuously. When the feeder is not operating, the system fluid pressure is dropped through relief valve 122 which is remotely controlled by pilot valve 120. This valve 120 is in communication with the relief valve 122 and the reservoir 98 through lines 121 and 123 respectively. These lines are sufficiently long enough to locate the control station conveniently to the operator.

Figure 5:
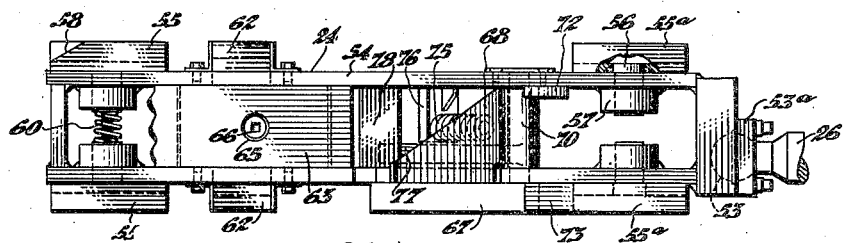
Figure 5 is a top plan view of the barney.
Figure 6:
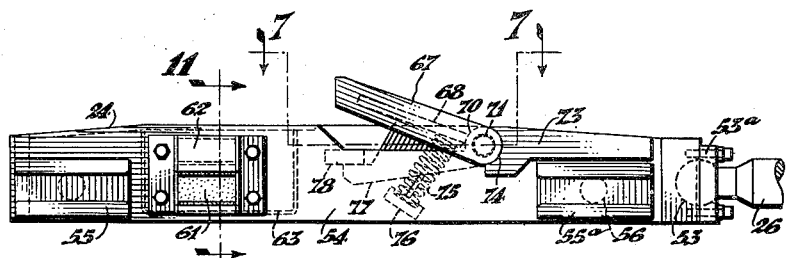
Figure 6 is a side elevation of the barney.
Figure 7:
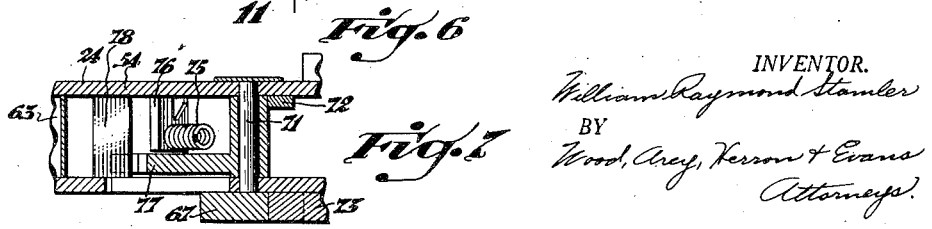
Figure 7 is a sectional view taken along line 7—7 of Figure 6.

The operator wishing to move the cars, moves lever 118 which actuates pilot valve 120 causing relief valve 122 to control the system pressure so that it builds up to a predetermined value, thus providing the system with the desired operating pressure. Check valve 124 is spring loaded to insure sufficient pressure to operate the selector valve pilot system even if there is insufficient resistance to the barney movement to build up the required pilot pressure. The increased pressure thrown on the supply line causes spring loaded check valve 124 to open and oil flows through selector valve 100 to line 38 causing piston 30 to move forward pushing barney 25 and the car ahead of it. When the piston reaches the end of its stroke, a cam surface 58 on the right front shoe of barney 25 (see Figure 5) trips valve 103 causing pressure to be applied to line 105 which adjusts the selector valve 100 so that line 38 is in communication with exhaust line 109 and the supply line 99a feeds line 101 leading to the head end of cylinder 31.

While piston 30 has been advancing the oil in the forward end of the cylinder 32 has been driven out through line 114 and into the forward end of cylinder 31. The increased pressure in the forward end of this cylinder causes piston 28 to move backward forcing the oil in the head end of the cylinder 31 ahead of it, through lines 101, 109 and 108 to the tank, and withdrawing barney 24 to its starting position. Since the selector valve 100 is reversed by operation of valve 103 and pressure is now applied to line 101, piston 28 starts its forward motion advancing barney 24 which has by now engaged the car and drives it forward until the end of the stroke is reached and pilot valve 102 is tripped which again reverses the selector valve 100 causing the supply line oil to be diverted from line 101 to line 38. Since the oil ahead of piston 28 has been driven out of the forward end of cylinder 31 through the line 114 into the forward end of cylinder 32, piston 30 is now returned to its initial starting position and the cycle will begin to be repeated. The cycle will continue to repeat itself until the operator cuts off the pressure in the main supply line 99a at valve 122 by opening valve 120 by throwing lever 118.

Figure 14:
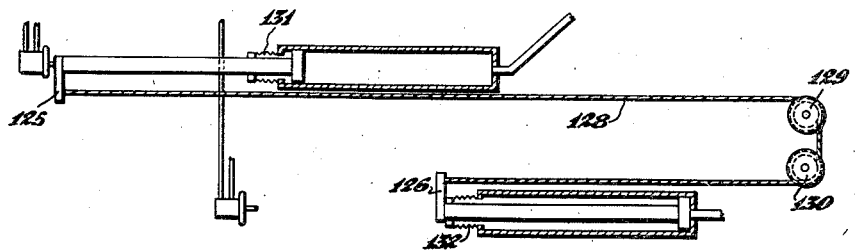
Figure 14 is a diagrammatic view of a piston return mechanism which may be used alternatively to the hydraulic piston return mechanism of Figure 13.

An alternative mechanical piston return system, which may be substituted for the hydraulic piston return system of Figure 13, is shown in Figure 14. Brackets 125 and 126 are secured to and extend laterally from the respective ends of the piston rods 26 and 27. The ends of a wire cable 128 are secured to these brackets. This cable passes around spacing sheaves or pulleys 129 and 130 which maintain the cable in parallel alignment with the axes of the piston rods. As piston 30 begins its forward motion under hydraulic pressure supplied through line 38, the piston advances pulling the cable around the sheaves 129 and 130 and causing piston 28 to move rearwardly in its retraction stroke. When barney 25 reaches the end of its stroke, pilot valve 103 is tripped, the selector valve 100 is changed and pressure is supplied to the head end of cylinder 31 causing piston 28 to move forward and to draw the cable 128 around the pulleys in the other direction. When this system is used, floating dust covers 131 and 132 supplant the floating seals at the ends of the cylinders.

In order to simplify the disclosure, some of the hydraulic lines connecting the various valves and cylinders have not been shown in Figures 2, 15 and 16. However, those skilled in the art will readily appreciate that they are to be installed in the manner diagrammatically shown in Figures 13 and 14. Obviously, they can be arranged within the framework of the unit in a compact manner.

Having described my invention, I claim:

1. A car shifter comprising a pair of fluid power cylinders arranged in substantially parallel but longitudinally offset relationship to one another, barneys connected to said power cylinders respectively to be actuated thereby, guides supporting said barneys, a fluid power source, means for directing fluid power into one of said power cylinders for advancement of the barney driven by it, and means controlled by said barney at a predetermined point in the course of its advancement for selectively directing fluid power from said source to the other barney to effect the sequential advancement thereof.

2. A car shifting apparatus comprising fluid power cylinders arranged in substantially parallel and longitudinally offset relationship to one another, car moving barneys connected respectively to said fluid power cylinders for actuation thereby, and a hydraulic circuit including a reservoir, a source of fluid power and selector valve means inter-connecting the fluid power source to said reservoir and said fluid power cylinders, said selector valve means being constructed to direct fluid power to one of said power cylinders to advance the barney connected thereto, and means engaged by said barney during its advancement for actuating said selector valve means selectively to direct fluid power to the other of said power cylinders.

3. A car moving barney adapted for reciprocating translation on guides comprising an elongated body member having a top and sides, shoes mounted on the opposite side walls of said body member and adapted to ride on said guides, a car engaging pawl, said pawl arranged along one of said side walls, and having a reinforcing member extending laterally inwardly of said body, said pawl and said reinforcing member each having a rounded extremity, rounded seats formed on said body member and embracing the rounded extremities of said pawl and reinforcing member, a pivot pin extending laterally of the body member and journalled in the respective side walls, said pin passing through and loosely journalling said pawl and said reinforcing member, resilient means for urging said pawl in upward rotation about said pin and above said body top, and means for limiting the upward movement of said pawl.

4. A car shifting mechanism comprising guides extending along the path of travel of a car, a barney, guide engaging shoes pivotally mounted in opposite sides of said barney and adapted for translatable engagement with said guides, a pawl pivotally mounted on said barney, resilient means for urging said pawl upwardly to extend above said barney for engagement with a car but permitting said pawl to be depressed for passing said car, and means for reciprocating said barney longitudinally along said guides, said means including a fluid power cylinder, a piston and a piston rod assembly in which the respective ends of the piston rod are in flexible articulation connection with the barney and the piston.

5. Car shifter apparatus comprising a skidable frame adapted to be disposed between a pair of car tracks, said frame having longitudinal barney guides, barneys mounted upon said guides and being movable in substantially offset but partially coextensive paths of movement, a hydraulic motor power system, and means for sequentially advancing and retracting said barneys one after another through their paths of movement by said motor power system.

6. Car shifting apparatus comprising a skidable frame adapted to be installed between car rails, said frame including guide members delineating substantially parallel tracks, barney members mounted upon said tracks to be guided and supported thereby, said barney members being movable in longitudinally offset partially coextensive paths, a hydraulic power cylinder in actuating connection with each of said barney members for effecting longitudinal movement thereof, a source of fluid power, means selectively directing fluid power to the power cylinders, means for controlling the first named means adapted to be barney actuated upon movement of said barneys to predetermined points in their paths of movement, and an over-load relief device responsive to the development of back pressure beyond a predetermined pressure in said hydraulic cylinders.

7. Car shifting apparatus comprising a skidable frame adapted to be installed between car rails, said frame including guide members delineating a pair of substantially parallel tracks, a pair of barney members, each barney of the pair mounted upon a track to be guided thereby, said barney members being movable in longitudinally offset, partially coextensive paths, hydraulic power cylinders in actuating connection with said barney members for effecting movement thereof in said paths, a source of fluid power, means for directing fluid power to one of said power cylinders, and means controlled by the barney actuated by that power cylinder for selectively directing fluid power to the other of said power cylinders upon movement of said barney to a predetermined point in its path of movement.

8. A car shifting mechanism comprising a cylinder, a piston mounted for reciprocation within said cylinder, a piston rod connected at one end to said piston in flexible articulation therewith, said cylinder having a flexible extension, said extension having an end closure element slidably mounted on said piston rod and constituting a fluid-tight seal therewith, a barney for engaging and moving a car, said barney connected to the other end of said piston rod in flexible articulation therewith, guides defining the path of travel of said barney and upon which said barney is translatably mounted, and power means for reciprocating said piston in said cylinder.

9. A car shifting mechanism comprising; a cylinder, a piston mounted for reciprocation within said cylinder, a piston rod connected at one end to said cylinder in flexible articulation therewith, said cylinder having a flexible extension, said extension having an end closure element slidably mounted on said piston rod and constituting a fluid-tight seal therewith, a barney for engaging and moving a car, said barney connected to the other end of said piston rod in flexible articulation therewith, guides defining the path of travel of said barney, said barney having guide engaging members pivotally mounted thereon in translatable engagement with said guides, and power means for reciprocating said piston in said cylinder.

10. A car shifting mechanism comprising; a pair of car engaging members, a pair of fluid cylinders, pistons reciprocably mounted in each of the cylinders, piston rods connecting said car engaging members to said pistons, means for alternately applying fluid pressure to the head end of each cylinder, a fluid line connecting the other ends of each cylinder and providing fluid communication therethrough, whereby fluid pressure applied at the head end of one cylinder will cause the piston in said cylinder to move forwardly and coincidentally exert fluid pressure through said line on the piston of said other cylinder causing the latter piston to move rearwardly.

11. A car shifting mechanism comprising an elongated skidable frame adapted to be installed between car rails, said frame including members delineating a pair of substantially parallel guides extending longitudinally of the frame, a pair of barneys, each barney of the pair having a guide engaging element pivotally mounted thereon and in translatable engagement with one of the guides, a pair of cylinders fixed to the frame in parallel but longitudinally spaced relationship, a pair of pistons, each piston of the pair mounted for reciprocation in one of the cylinders, a pair of piston rods, each piston rod of the pair connected at one end in flexible articulation with a barney and connected at the other end in flexible articulation with one of the pistons, each cylinder having a flexible end closure member slidably embracing the piston rod associated with the cylinder, and power means for reciprocating said pistons in the cylinders, the flexible end closure members of the cylinders, the piston rod connections and the pivoted guide engaging elements on the barneys being effective to relieve the reciprocating pistons against binding incidental to misalignment of the frame due to uneven installation conditions.

12. In a car moving barney comprising an elongated body member, a car engaging pawl, means loosely journalling an end of said pawl for rotation of the pawl about an axis extending laterally of the body member, a spring urging said pawl in upward rotative movement about said axis, means limiting the upward movement of said pawl at a point above the top of the body member in normal car engaging position, the journalled end of said pawl being rounded on an arc centered on said axis, and a pawl seat formed on the body member rounded out in conformity with the curvature of the rounded end of the pawl and adapted to embrace said end, whereby regardless of whether the pawl is at normal car engaging position or below that position, thrusts transmitted through the pawl are absorbed by the pawl seat on the body member and not by the means journalling the pawl.

13. A car shifting mechanism comprising a frame adapted to be installed between car rails, said frame including a pair of longitudinally disposed guides, a car moving barney slidably engaged with each of the guides, a pair of fluid power cylinders fixed to the frame and extending longitudinally thereof, a piston mounted for reciprocating movement inside of each cylinder, a pair of piston rods, each piston rod of the pair connected at one end to a barney and connected at the other end to a piston within one of the cylinders, the latter connections being constructed and arranged to permit flexible articulation between the piston rods and the pistons, each cylinder having a flexibly mounted end seal slidably embracing the piston rod associated with the cylinder, whereby binding between the cylinders and pistons is relieved at the said latter connections in the event of frame warpage due to uneven installation conditions, and means for alternately reciprocally driving said pistons, said means including a source of fluid power, a selector valve adapted to shift said source of fluid power from one cylinder to the other, means interlinking said pistons arranged so that the forward movement of one under action of fluid power results in the retraction of the other, and means controlling the shifting of the selector valve adapted to be actuated in response to piston movement.

WILLIAM RAYMOND STAMLER.

REFERENCES CITED

The following references are of record in the file of this patent:

UNITED STATES PATENTS

| Number | Name | Date |
|---|---|---|
| 1,881,828 | Miller et al. | Oct. 11, 1932 |
| 2,496,916 | Kershaw | Feb. 7, 1950 |

FOREIGN PATENTS

| Number | Country | Date |
|---|---|---|
| 557,037 | Germany | July 28, 1932 |
| 583,918 | Germany | Aug. 31, 1933 |
| 587,780 | Germany | Oct. 26, 1933 |
| 625,684 | Germany | Jan. 23, 1936 |